US012781864B2

(12) United States Patent
Hirota et al.

(10) Patent No.: US 12,781,864 B2
(45) Date of Patent: Nov. 3, 2026

(54) PRESSURE-REGULATING VALVE

(71) Applicant: NIFCO INC., Yokosuka (JP)

(72) Inventors: Shohei Hirota, Yokosuka (JP); Norio Saito, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 18/848,517

(22) PCT Filed: Apr. 25, 2023

(86) PCT No.: PCT/JP2023/016287
§ 371 (c)(1),
(2) Date: Sep. 19, 2024

(87) PCT Pub. No.: WO2023/210638
PCT Pub. Date: Nov. 2, 2023

(65) Prior Publication Data
US 2025/0230880 A1 Jul. 17, 2025

(30) Foreign Application Priority Data
Apr. 27, 2022 (JP) ................................ 2022-073864

(51) Int. Cl.
*F16K 17/04* (2006.01)
*F16K 24/04* (2006.01)
*H01M 50/333* (2021.01)

(52) U.S. Cl.
CPC .............. *F16K 17/04* (2013.01); *F16K 24/04* (2013.01); *H01M 50/333* (2021.01); *Y02E 60/10* (2013.01)

(58) Field of Classification Search
CPC ..... F16K 17/0413; F16K 24/04; Y02E 60/10; H01M 50/317; H01M 50/333
(Continued)

(56) References Cited

U.S. PATENT DOCUMENTS 3,131,718 A * 5/1964 Mingrone ............... F16K 17/02 251/210
2002/0092567 A1* 7/2002 Herz ....................... F16K 17/04 137/516.29
(Continued)

FOREIGN PATENT DOCUMENTS

JP S59-168070 U 11/1984
JP 2589511 Y2 1/1999
(Continued)

OTHER PUBLICATIONS

Japan Patent Office, Notice of Reasons for Refusal for Japanese Patent Application No. 2024-517341 mailed on Oct. 31, 2025; 8 pp.
(Continued)

*Primary Examiner* — Robert K Arundale
(74) *Attorney, Agent, or Firm* — HAUPTMAN HAM, LLP

(57) ABSTRACT

A pressure-regulating valve for escaping a fluid inside an enclosure from an opening of the enclosure when internal pressure of the fluid rises. The pressure-regulating valve includes a cover part that includes a circumferential edge surrounding the opening in a plan view and that covers the opening, a seal part positioned between the circumferential edge of the cover part and a surface of the enclosure, an elastic member configured to generate urging force urging the cover part toward the enclosure in a first direction, and a base part that is fixed to the enclosure and that supports the elastic member such that the elastic member expands and contracts in the first direction.

6 Claims, 8 Drawing Sheets

(58) Field of Classification Search
USPC ........................................................ 429/54, 82
See application file for complete search history.

(56) References Cited

U.S. PATENT DOCUMENTS

| | | | | |
|---|---|---|---|---|
| 2021/0151723 | A1* | 5/2021 | Yue | H01M 50/317 |
| 2021/0320376 | A1* | 10/2021 | Zbiral | H01M 50/325 |
| 2021/0396323 | A1* | 12/2021 | Nakayama | F16K 27/0209 |
| 2023/0175602 | A1* | 6/2023 | Goldsche | F16K 17/0413<br>137/540 |
| 2023/0291067 | A1* | 9/2023 | Zbiral | F16K 17/0413 |
| 2024/0381549 | A1* | 11/2024 | Rodrigo | H01M 50/308 |
| 2024/0396154 | A1* | 11/2024 | Kraus | H01M 50/333 |
| 2024/0404916 | A1* | 12/2024 | Joshua | H05K 7/20327 |
| 2024/0421416 | A1* | 12/2024 | Shukla | H01M 50/333 |
| 2025/0239718 | A1* | 7/2025 | Schulz | H01M 50/249 |
| 2025/0337090 | A1* | 10/2025 | Streicher | H01M 50/394 |

FOREIGN PATENT DOCUMENTS

| | | | |
|---|---|---|---|
| JP | 3682596 | B2 | 8/2005 |
| JP | 2020-021897 | A | 2/2020 |
| WO | 2020/085210 | A1 | 4/2020 |

OTHER PUBLICATIONS

Japan Patent Office, Notice of Reasons for Refusal for Japanese Patent Application No. 2024-517341 mailed on Jun. 6, 2025; 8 pp.
PCT/ISA/210, "International Search Report for International Application No. PCT/JP2023/016287," Jul. 18, 2023, 4pp.

* cited by examiner

PRESSURE-REGULATING VALVE

RELATED APPLICATIONS

The present application is National Phase of International Application No. PCT/JP2023/016287 filed Apr. 25, 2023, and claims priority from Japanese Application No. 2022-073864, filed Apr. 27, 2022.

FIELD

The present invention relates to a pressure-regulating valve that regulates pressure inside an enclosure.

BACKGROUND

A pressure-regulating valve is a device for regulating pressure inside an enclosure. The enclosure is, for example, a battery pack mounted in a vehicle. Inside the battery pack, a device, such as a battery cell, is accommodated and sealed. The pressure-regulating valve is attached to the enclosure, such as the battery pack. For example, the pressure-regulating valve is placed to cover an opening formed in the enclosure. If the pressure inside the enclosure exceeds a threshold, the pressure-regulating valve works in such a manner that a fluid inside the enclosure is released outside. The pressure-regulating valve can prevent damage to the device inside the enclosure due to a pressure rise.

Several pressure-regulating valves have been proposed.

For example, Patent Literature 1 discloses a pressure-regulating valve that includes a base part attached to an opening of an enclosure and a cover part covering the base part. To the cover part, urging force toward the base part is applied. If internal pressure exceeds a threshold, the cover part moves in a direction away from the base part. Fluid inside the enclosure is released outside via a gap between the base part and the cover part and a gap between the cover part and the enclosure.

For example, Patent Literature 2 discloses a pressure-regulating valve that includes a valve covering an opening of an enclosure and a lid covering the valve. If internal pressure exceeds a threshold, the valve moves in a direction away from the enclosure. Fluid inside the enclosure is released outside via a gap between the valve and the enclosure and a gap between the lid and the enclosure.

CITATION LIST

Patent Literature

Patent Literature 1: Japanese Patent Application Laid-open No. 2020-21897

Patent Literature 2: Japanese Patent No. 3682596

SUMMARY

Technical Problem

In the pressure-regulating valve described in Patent Literature 1, the flow of the fluid is restricted by the gap between the base part and the cover part and the gap between the cover part and the enclosure. In the pressure-regulating valve described in Patent Literature 2, the flow of the fluid is restricted by the gap between the valve and the enclosure and the gap between the lid and the enclosure.

An object of the present invention is to provide a pressure-regulating valve that can solve these problems.

Solution to Problem

The present invention provides a pressure-regulating valve for escaping a fluid inside an enclosure from an opening of the enclosure when internal pressure of the fluid rises, the pressure-regulating valve comprising:

- a cover part that includes a circumferential edge surrounding the opening in a plan view and that covers the opening,
- a seal part positioned between the circumferential edge of the cover part and a surface of the enclosure,
- an elastic member configured to generate urging force urging the cover part toward the enclosure in a first direction, and
- a base part that is fixed to the enclosure and that supports the elastic member such that the elastic member expands and contracts in the first direction.

In the pressure-regulating valve according to the present invention, the cover part may include a cover body and a shaft coupled to the cover body and extending toward the opening of the enclosure, and the base part may include a housing engaging with the shaft and a plurality of legs coupled to the housing, extending outward from the housing in a plan view, and fastened to the surface of the enclosure.

In the pressure-regulating valve according to the present invention, ends of the legs may be fastened to a protrusion protruding inward from an outer edge of the opening of the enclosure.

In the pressure-regulating valve according to the present invention, the circumferential edge of the cover part may be arranged close to the opening of the enclosure.

In the pressure-regulating valve according to the present invention, the cover part may include an end lock coupled to the shaft, and the elastic member may include an upper end in contact with the housing of the base part and a lower end in contact with the end lock of the cover part.

In the pressure-regulating valve according to the present invention, the base part may include a metal bracket forming at least a portion of the base part supporting the elastic member and a portion of the base part fixed to the surface of the enclosure, and a resin layer in contact with the metal bracket.

The present invention provides a pressure-regulating valve for escaping a fluid inside an enclosure from an opening of the enclosure when internal pressure of the fluid rises, the pressure-regulating valve comprising:

- a case that includes a discharge hole communicating with the opening and that is fixed to a surface of the enclosure,
- a cover part that includes a circumferential edge surrounding the discharge hole in a plan view and that covers the discharge hole,
- a seal part positioned between the circumferential edge of the cover part and a surface of the case, and
- an elastic member configured to generate urging force urging the cover part toward the enclosure in a first direction,
- wherein the case supports the elastic member such that the elastic member expands and contracts in the first direction.

In the pressure-regulating valve according to the present invention, the case may include a metal bracket forming at least a portion of the case supporting the elastic member and a portion of the case fixed to the surface of the enclosure, and a resin layer in contact with the metal bracket.

Advantageous Effects of Invention

According to the present invention, the flow rate of a fluid released outside can be increased.

DESCRIPTION OF EMBODIMENTS

Figure 1:
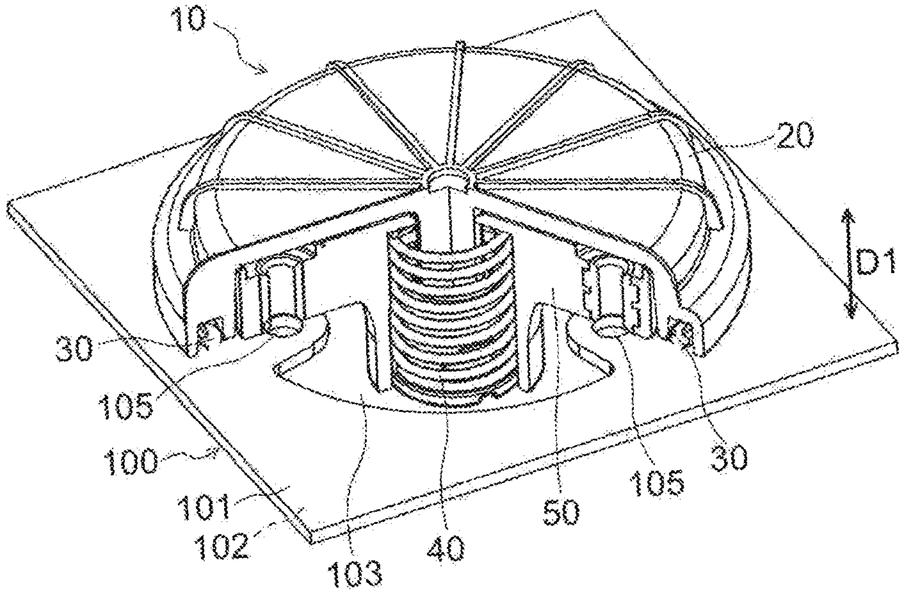
FIG. 1 is a partial sectional view illustrating a pressure-regulating valve attached to an enclosure.

Embodiments of the present invention will be described with reference to the drawings. In the drawings attached to this specification, for convenience of facilitation of understanding, the scale, the ratio of lengthwise and breadthwise dimensions, and the like are changed and exaggerated from actual ones as appropriate.

FIG. 1 is a partial sectional view illustrating an example of a pressure-regulating valve 10. The pressure-regulating valve 10 is attached to an enclosure 100. The enclosure 100 is, for example, a battery pack mounted in a vehicle. Inside the battery pack, a device, such as a battery cell, is accommodated and sealed. The enclosure 100 includes a surface 101 and a rear surface 102. The surface 101 is in contact with an atmosphere outside the enclosure 100. The rear surface 102 is in contact with an interior space sealed by the enclosure 100. The enclosure 100 includes an opening 103 penetrating the enclosure 100. The pressure-regulating valve 10 is attached to the enclosure 100 so as to cover the opening 103.

If pressure inside the enclosure 100 exceeds a threshold, the pressure-regulating valve 10 works in such a manner that a fluid, such as gas, inside the enclosure 100 is released outside. The pressure inside the enclosure 100 is also referred to as internal pressure.

Figure 2:
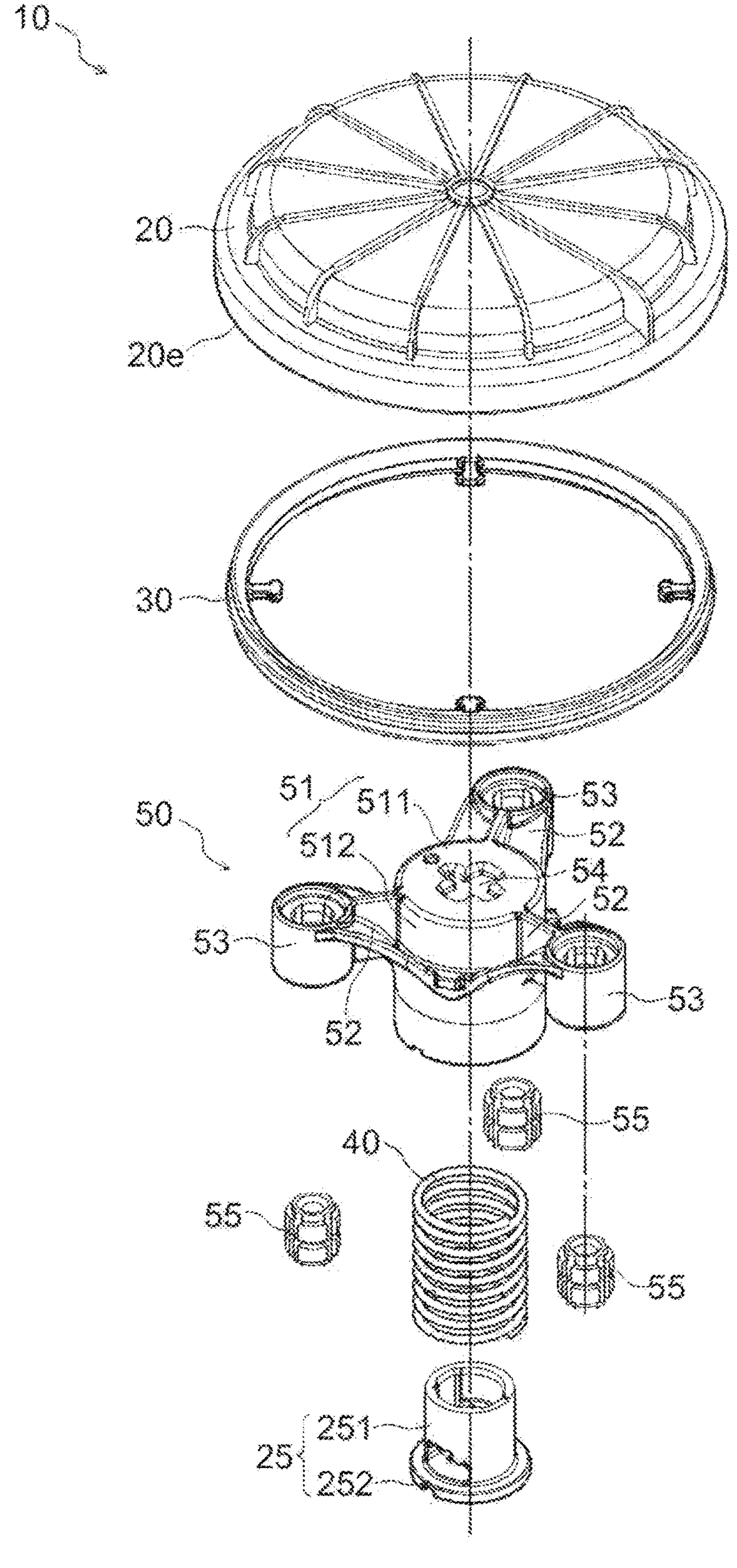
FIG. 2 is an exploded view illustrating the pressure-regulating valve.

The pressure-regulating valve 10 will be described in detail. FIG. 2 is an exploded view illustrating the pressure-regulating valve 10. The pressure-regulating valve 10 includes a cover part 20, a seal part 30, an elastic member 40, and a base part 50. By assembling the cover part 20, the seal part 30, the elastic member 40, and the base part 50, the modularized pressure-regulating valve 10 is made. The pressure-regulating valve 10 is attached to the enclosure 100 while being modularized.

Figure 3:
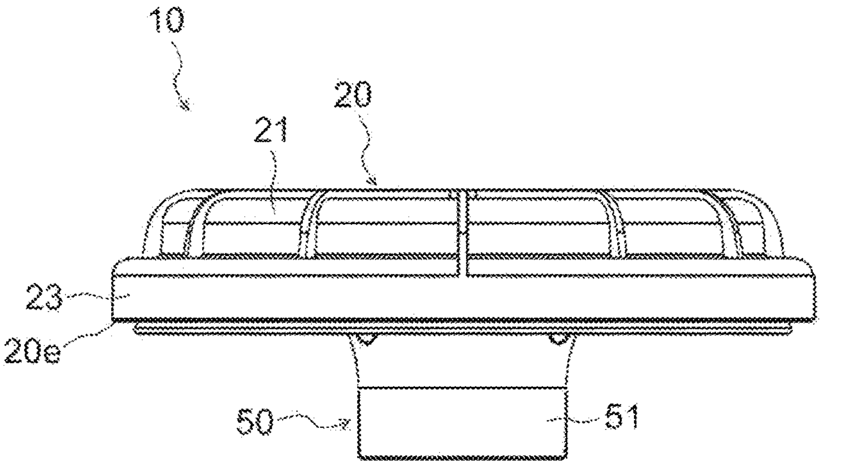
FIG. 3 is a side view illustrating the pressure-regulating valve.
Figure 4:
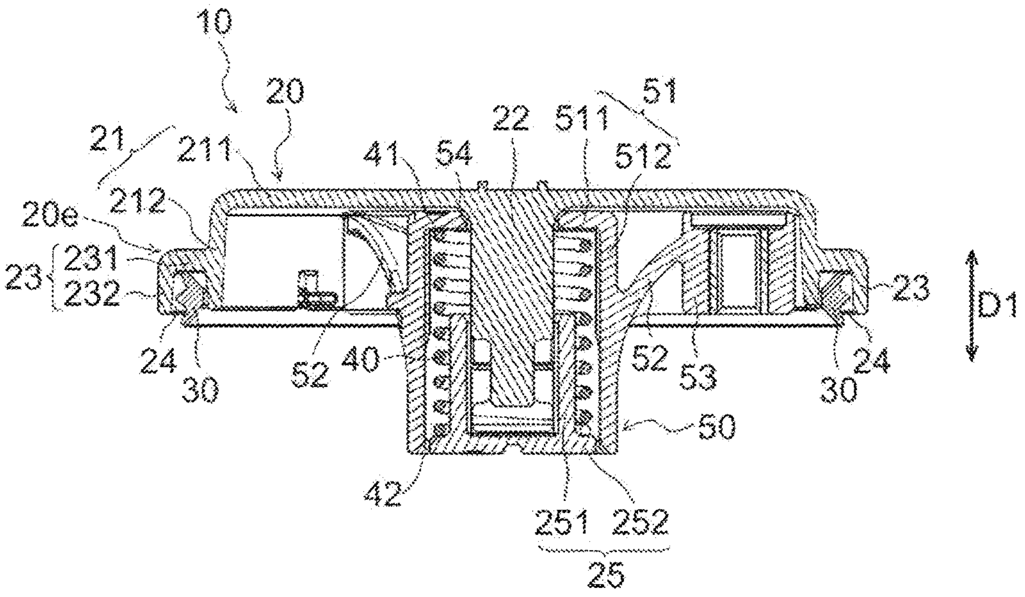
FIG. 4 is a longitudinal sectional view illustrating the pressure-regulating valve.

Each constituent of the pressure-regulating valve 10 will be described in detail with reference to FIGS. 1 to 4. FIG. 3 is a side view illustrating the pressure-regulating valve 10. FIG. 4 is a longitudinal sectional view illustrating the pressure-regulating valve 10.

(Cover Part)

The cover part 20 includes a circumferential edge 20*e* surrounding the opening 103 of the enclosure 100 in a plan view. The cover part 20 can move in a first direction D1 in accordance with the internal pressure. The first direction D1 is a normal direction of the surface 101 of the enclosure 100.

The cover part 20 includes a cover body 21 and a shaft 22. The cover body 21 includes an upper portion 211 covering the opening 103 of the enclosure 100 in a plan view and a side portion 212 expanding from the upper portion 211 toward the enclosure 100. The plan view indicates that an object is viewed along the normal direction of the surface 101 of the enclosure 100. The upper portion 211 may have a circular shape in a plan view. The side portion 212 may have a tube shape.

The shaft 22 is coupled to the cover body 21. For example, the shaft 22 is coupled to the center of the cover body 21 in a plan view. The shaft 22 extends linearly from the cover body 21 toward the opening 103.

The cover part 20 may include a flange 23. The flange 23 is, for example, coupled to the side portion 212 of the cover body 21. The flange 23 includes a first portion 231 expanding outward from the side portion 212. When the pressure-regulating valve 10 is in a closed state, the first portion 231 presses the seal part 30 against the surface 101 of the enclosure 100. "Outward" indicates a direction away from the center of the opening 103 in a planar direction of the surface 101 of the enclosure 100. "Inward" described later indicates a direction toward the center of the opening 103 in the planer direction of the surface 101 of the enclosure 100.

The flange 23 may include a second portion 232 expanding from the first portion 231 toward the enclosure 100. In this case, the first portion 231 and the second portion 232 of the flange 23 and the side portion 212 of the cover body 21 form the circumferential edge 20*e* surrounding the opening 103 of the enclosure 100. In the circumferential edge 20*e*, a space surrounded by the first portion 231, the second portion 232, and the side portion 212 of the cover body 21 may define a groove 24 where the seal part 30 is accommodated.

The cover part 20 may include an end lock 25. The end lock 25 is coupled to the shaft 22. The end lock 25 includes, for example, a side portion 251 and a lower portion 252 positioned below the shaft 22. The side portion 251 surrounds the shaft 22 in a plan view. The side portion 251 may be fixed to the shaft 22. "Downward" indicates a direction from the cover part 20 toward the surface 101 in the first direction D1. "Upward" described later indicates a direction from the surface 101 toward the cover part 20 in the first direction D1.

(Seal Part)

The seal part 30 is positioned between the circumferential edge 20*e* of the cover part 20 and the surface 101 of the enclosure 100. In a closed state where the pressure-regulating valve 10 is closed, the seal part 30 is in contact with the surface 101 of the enclosure 100. The seal part 30 is, for example, a gasket. As illustrated in FIG. 4, the seal part 30 may protrude downward from the groove 24.

(Elastic Member)

The elastic member 40 urges the cover part 20 toward the enclosure 100 in the first direction D1. The elastic member 40 expands and contracts in the first direction D1 in accordance with movement of the cover part 20 in the first direction D1. The elastic member 40 is, for example, a spring. As described later, the elastic member 40 in an open state where the pressure-regulating valve 10 is open contracts in comparison with the elastic member 40 in the closed state.

The elastic member 40 includes an upper end 41 and a lower end 42. As illustrated in FIG. 4, the upper end 41 is in contact with the base part 50. The lower end 42 is in contact with the lower portion 252 of the end lock 25 of the cover part 20. The shaft 22 of the cover part 20 is inserted inside the elastic member 40.

(Base Part)

The base part 50 is fixed to the enclosure 100. As illustrated in FIG. 2, the base part 50 may include a housing 51, legs 52, and fastened portions 53.

The housing 51 includes an upper portion 511 overlapping the opening 103 of the enclosure 100 in a plan view and a side portion 512 expanding downward from the upper portion 511. The upper portion 511 may have a circular shape in a plan view. The above-described upper end of the elastic member 40 is in contact with the upper portion 511. The side portion 512 may have a tube shape. As illustrated in FIG. 4, when the pressure-regulating valve 10 is in the closed state, the shaft 22 and the end lock 25 of the cover part 20 and the elastic member 40 may be positioned in a space inside the side portion 512.

As illustrated in FIGS. 2 and 4, an engaging portion 54 may be formed in the upper portion 511 of the housing 51. The engaging portion 54 engages the shaft 22 of the cover part 20. The engaging portion 54 is, for example, a hole into which the shaft 22 is inserted.

As illustrated in FIG. 2, the legs 52 are coupled to the side portion 512 of the housing 51. The legs 52 extend outward from the housing 51 in a plan view. The legs 52 include ends overlapping the surface 101 of the enclosure 100 in a plan view. The base part 50 may include a plurality of the legs 52. For example, the base part 50 may include three legs 52. The legs 52 may be arranged at regular intervals along the circumferential direction of the housing 51.

The fastened portions 53 may be formed at the legs 52. The fastened portions 53 are portions of the base part 50 that are fastened to the enclosure 100. The fastened portions 53 are, for example, holes into which fastening tools 55 illustrated in FIG. 2 are inserted. The fastening tools 55 are, for example, bolts. By inserting the fastening tools 55 into the fastened portions 53 of the base part 50 and fastening holes, described later, of the enclosure 100 and fixing the fastening tools 55 with nuts or the like, which are not illustrated, the base part 50 is fixed to the enclosure 100.

Figure 5:
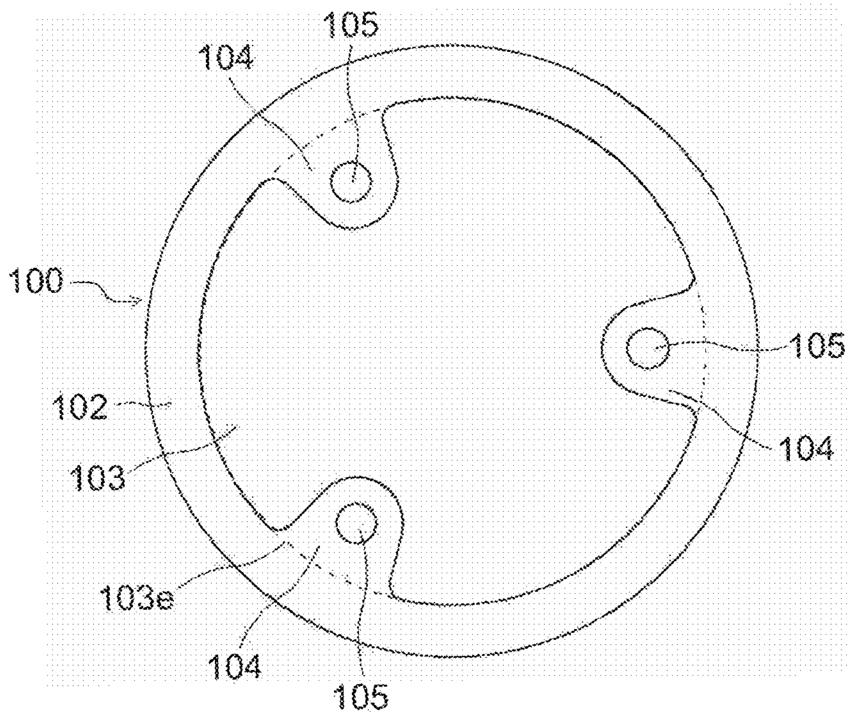
FIG. 5 is a bottom view illustrating a case where the enclosure is viewed from a rear surface side.
Figure 6:
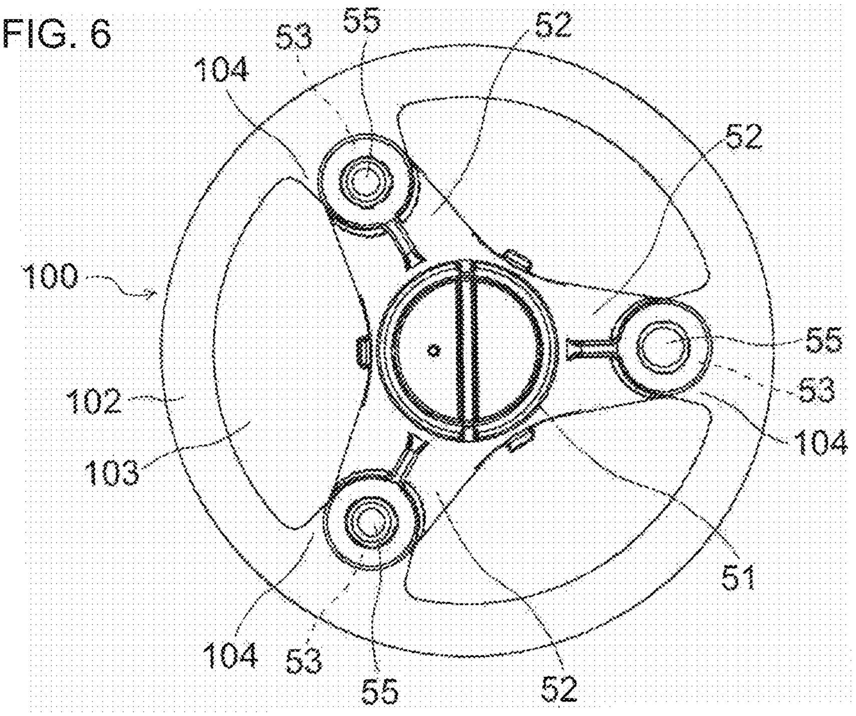
FIG. 6 is a bottom view illustrating a case where the pressure-regulating valve attached to the enclosure is viewed from the rear surface side.

Next, a positional relationship between the enclosure 100 and the base part 50 will be described. FIG. 5 is a bottom view illustrating a case where the enclosure 100 without the pressure-regulating valve 10 attached is viewed from the rear surface 102 side. FIG. 6 is a bottom view illustrating a case where the pressure-regulating valve 10 attached to the enclosure 100 is viewed from the rear surface 102 side.

As illustrated in FIG. 5, the opening 103 of the enclosure 100 may include an outer edge having a substantially circular shape in a plan view. The reference sign 103*e* indicates an envelope circle of the opening 103. The envelope circle 103*e* is composed of a circular line enveloping the outer edge of the opening 103 in a plan view.

The enclosure 100 may include a plurality of protrusions 104 that are in contact with the opening 103 and that protrude from the envelope circle 103*e* toward the center of the opening 103. For example, the enclosure 100 may include three protrusions 104. The protrusions 104 may be arranged at regular intervals along the circumferential direction of the envelope circle 103*e*. In the protrusions 104, the fastening holes 105 into which the fastening tools 55 are inserted are formed. As illustrated in FIG. 5, the fastening holes 105 are positioned on the inner side relative to the envelope circle 103*e*.

The opening 103 preferably has a lower protrusion ratio. The protrusion ratio is a ratio of the total of lengths of portions of the envelope circle 103*e* that overlap the protrusions 104 to the total length of the envelope circle 103*e*. As illustrated in FIG. 6, the legs 52 of the base part 50 overlap the protrusions 104. The lower the protrusion ratio is, the larger the flow path of the fluid that can reach the outside without being obstructed by the base part 50 is. Thus, as the protrusion ratio is lower, the flow rate of the fluid released outside can be increased. The protrusion ratio is, for example, 0.5 or greater, and may be 0.6 or greater or 0.7 or greater. The protrusion ratio is, for example, 0.9 or less.

As illustrated in FIG. 6, the base part 50 is fixed to the enclosure 100 so as not to completely cover the opening 103. The base part 50 preferably has a lower cover ratio. The cover ratio is a ratio of the area of portions of the base part 50 that overlap the opening 103 to the area of the opening 103. The cover ratio is, for example, 0.8 or less, and may be 0.7 or less or 0.6 or less. The cover ratio is, for example, 0.2 or greater.

Figure 7:
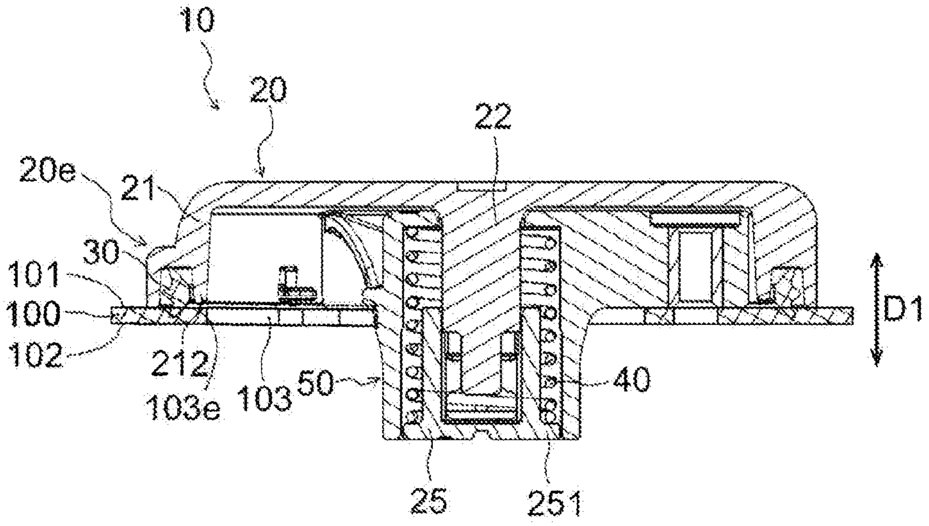
FIG. 7 is a longitudinal sectional view illustrating the pressure-regulating valve and the enclosure in a closed state.

Next, operation of the pressure-regulating valve 10 will be described. FIG. 7 is a longitudinal sectional view illustrating the pressure-regulating valve and the enclosure in the closed state. The elastic member 40 generates urging force urging the cover part 20 toward the enclosure 100. For example, the elastic member 40 is in a contracting state. Thus, restoring force is generated in the elastic member 40. The elastic member 40 presses the side portion 251 of the end lock 25 of the cover part 20 downward, so that the cover part 20 is urged downward. Thus, the seal part 30 attached to the circumferential edge 20*e* of the cover part 20 comes into contact with the surface 101 of the enclosure 100. This seals the interior space of the enclosure 100.

As illustrated in FIG. 7, the circumferential edge 20*e* of the cover part 20 may be close to the opening 103 of the enclosure 100. The shortest distance between the inner surface of the side portion 212 forming the circumferential edge 20*e* and the outer edge of the opening 103 is, for example, 10 mm or shorter, and may be 5 mm or shorter, 2 mm or shorter, or 1 mm or shorter. This allows the fluid inside the enclosure 100 to be smoothly released outside in the open state described later.

Figure 8:
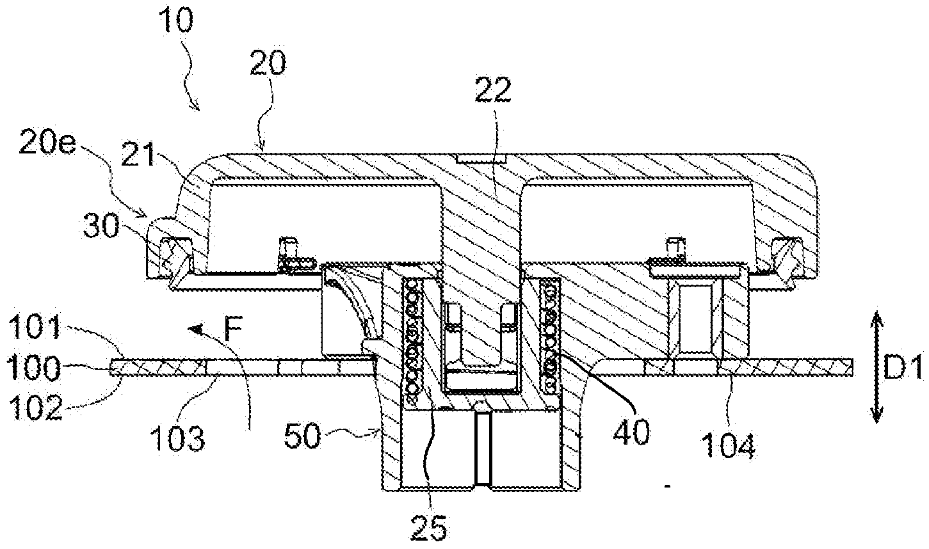
FIG. 8 is a longitudinal sectional view illustrating the pressure-regulating valve and the enclosure in an open state.

FIG. 8 is a longitudinal sectional view illustrating the pressure-regulating valve and the enclosure in the open state. If the internal pressure of the enclosure 100 exceeds a predetermined threshold, force applied by the internal pressure to the cover part 20 is greater than force applied by the elastic member 40 to the cover part 20. As a result, the cover part 20 moves upward. The cover part 20 moves upward until the force applied by the internal pressure to the cover part 20 balances with the force applied by the elastic member 40 to the cover part 20. In the open state, the elastic member 40 contracts more than the elastic member 40 in the closed state.

When the cover part 20 moves upward, a gap is generated between the circumferential edge 20*e* of the cover part 20 and the surface 101 of the enclosure 100. As described above, the circumferential edge 20*e* is close to the opening 103. Furthermore, the opening 103 is not completely covered by the base part 50. Thus, the fluid inside the enclosure 100 can pass through the gap between the circumferential edge 20*e* and the surface 101 and smoothly reach the outside of the pressure-regulating valve 10. In other words, the flow rate of the fluid released outside can be increased.

As the fluid is released outside, the internal pressure decreases. If the force applied by the internal pressure to the cover part 20 is smaller than the force applied by the elastic member 40 to the cover part 20, the restoring force of the elastic member 40 moves the cover part 20 downward, and the pressure-regulating valve 10 returns to the closed state.

Note that various modifications can be made to the above-described embodiment. Modifications will be described below with reference to the drawings as necessary. In the following description and the drawings used in the following description, parts that can be configured in the same way as in the above-described embodiment are denoted by the same reference signs used for the corresponding parts of the above-described embodiment, and overlapping description is omitted. Furthermore, when it is clear that the operation and effect acquired by the above-described embodiment can also be acquired by the modifications, its description may be omitted.

First Modification

Figure 9:
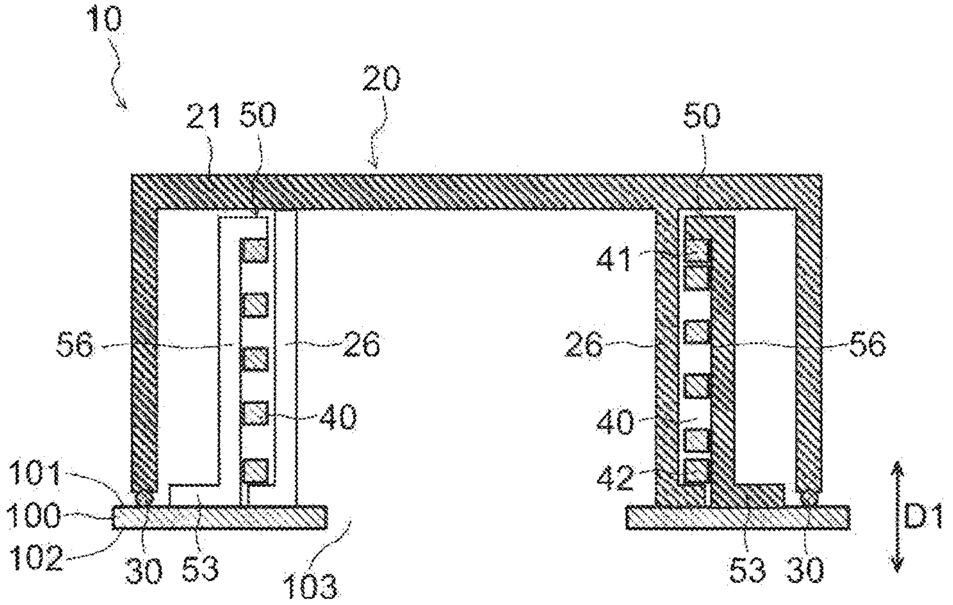
FIG. 9 is a longitudinal sectional view illustrating a pressure-regulating valve according to a first modification.
Figure 10:
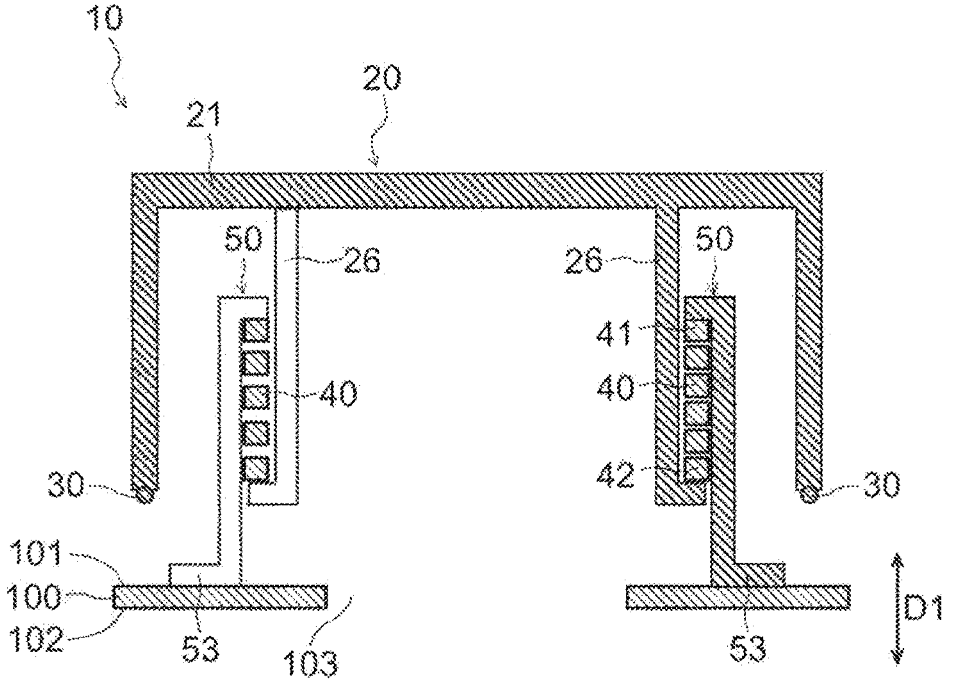
FIG. 10 is a longitudinal sectional view illustrating the pressure-regulating valve according to the first modification.

FIGS. 9 and 10 are longitudinal sectional views illustrating a pressure-regulating valve 10 according to a first modification. FIG. 9 illustrates the pressure-regulating valve 10 in the closed state. FIG. 10 illustrates the pressure-regulating valve 10 in the open state.

The above-described embodiment has exemplified such arrangement that the elastic member 40 overlaps the opening 103 of the enclosure 100 in a plan view. However, as illustrated in FIGS. 9 and 10, the elastic member 40 may be arranged outside the opening 103. In this case, the cover part 20 includes a plurality of first pressing portions 26 coupled to the cover body 21 and positioned outside the opening 103. The first pressing portions 26 are in contact with the lower end 42 of the elastic member 40. The urging force of the elastic member 40 is transmitted to the cover body 21 via the first pressing portions 26. Furthermore, the base part 50 includes a plurality of second pressing portions 56 that is in contact with the upper end 41 of the elastic member 40 while being outside the opening 103. The second pressing portions 56 are coupled to the fastened portions 53 fastened to the enclosure 100.

Similar to the above-described legs 52, the first pressing portions 26 and the second pressing portions 56 are arranged at regular intervals along the circumferential direction of the opening 103. In other words, the cover part 20 includes gap portions where no first pressing portion 26 is formed, and the base part 50 also includes gap portions where no second pressing portion 56 is formed. When the pressure-regulating valve 10 is in the open state, the fluid inside the enclosure 100 is released outside via the gap portions of the cover part 20, the gap portions of the base part 50, and a gap between the cover part 20 and the enclosure 100. Even in this modification, similar to the case of the above-described embodiment, the fluid can smoothly reach the gap between the cover part 20 and the enclosure 100. Thus, the flow rate of the fluid released outside can be increased.

Second Modification

The above-described embodiment and modification have exemplified the cover part 20 covering the opening 103 of the enclosure 100. In this modification, an example in which a base part fixed to the surface 101 of the enclosure 100 includes a discharge hole communicating with the opening 103 of the enclosure 100 and the cover part 20 covers the discharge hole of the base part will be described. In this modification, the base part including the discharge hole communicating with the opening 103 of the enclosure 100 is referred to as a case.

Figure 11:
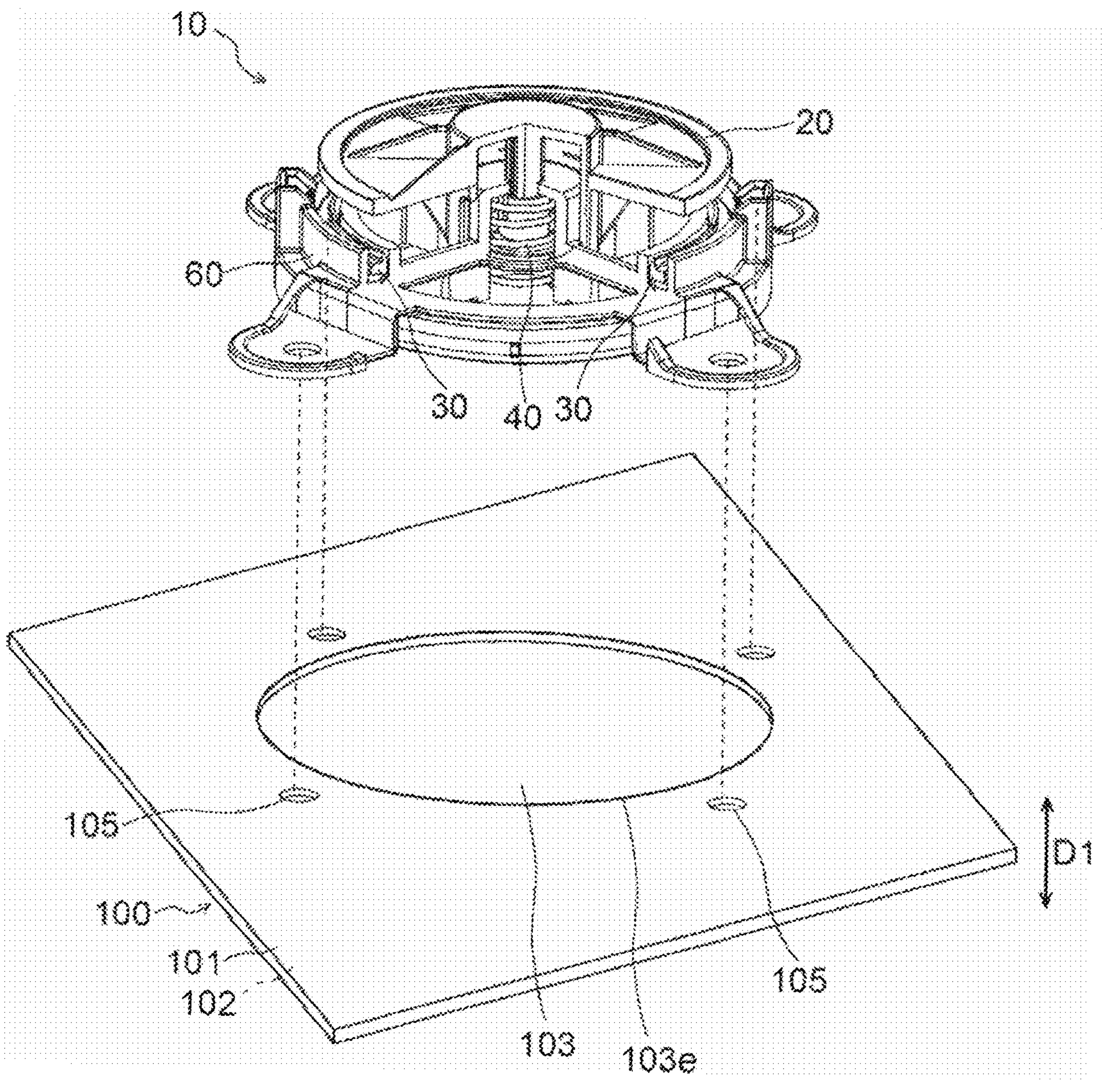
FIG. 11 is a partial sectional view illustrating a pressure-regulating valve according to a second modification.

FIG. 11 is a partial sectional view illustrating a pressure-regulating valve 10 according to this modification. The pressure-regulating valve 10 includes the cover part 20, the seal part 30, the elastic member 40, and a case 60. The case 60 is fixed to the enclosure 100. The enclosure 100 includes a plurality of fastening holes 105 for fixing the case 60 to the enclosure 100. The fastening holes 105 are positioned outside the envelope circle 103*e* of the opening 103.

Figure 12:
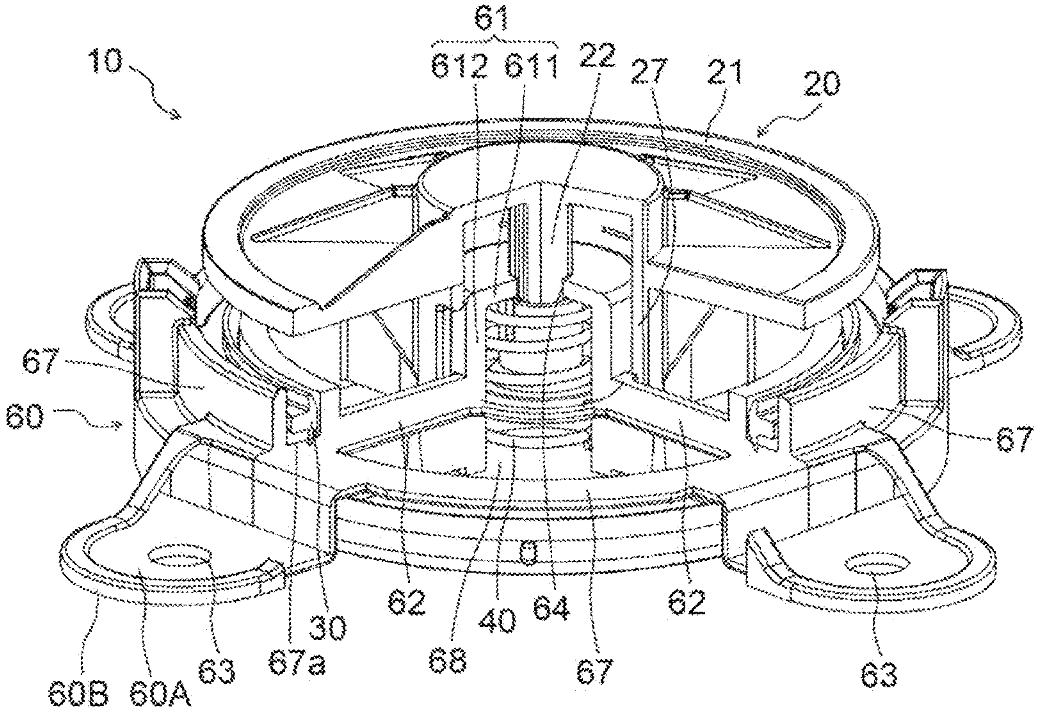
FIG. 12 is a partial sectional view illustrating the pressure-regulating valve according to the second modification.

With reference to FIG. 12, the case 60 will be described in detail. The case 60 may include a housing 61, legs 62, fastened portions 63, and an engaging portion 64. The housing 61, the legs 62, the fastened portions 63, and the engaging portion 64 are constituents corresponding to the housing 51, the legs 52, the fastened portions 53, and the engaging portion 54 of the base part 50. The case 60 may further include a plurality of outer frames 67 and a plurality of discharge holes 68.

Similar to the housing 51, the housing 61 supports the elastic member 40 in such a manner that the elastic member 40 expands and contracts in the first direction D1. For example, similar to the housing 51, the housing 61 includes an upper portion 611 and a side portion 612. The upper end of the elastic member 40 is in contact with the upper portion 611. Similar to the engaging portion 54, the engaging portion 64 into which the shaft 22 of the cover part 20 is inserted is formed in the upper portion 611 of the housing 61.

Similar to the legs 52, the legs 62 extend outward from the housing 61 in a plan view. The legs 62 include ends overlapping the surface 101 of the enclosure 100 in a plan view. Similar to the legs 52, at the ends of the legs 62, the fastened portions 63 are formed. The fastened portions 63 are, for example, holes into which fastening tools are inserted. By inserting the fastening tools into the fastened portions 63 of the case 60 and the fastening holes 105 of the enclosure 100 and fixing the fastening tools with nuts or the like, the case 60 is fixed to the enclosure 100.

The outer frames 67 are each coupled to two legs 52 adjacent to each other in the circumferential direction of the pressure-regulating valve 10. The two adjacent legs 52 are also referred to as a first leg 52 and a second leg 52. One outer frame 67 extends from an end of the first leg 52 to an end of the second leg 52 along the circumferential direction of the pressure-regulating valve 10. The combination of the outer frames 67 surrounds the opening 103 of the enclosure 100 in a plan view.

The discharge holes 68 are regions surrounded by the housing 61, the legs 62, and the outer frames 67 in a plan view. The discharge holes 68 at least partially overlap the opening 103 of the enclosure 100.

As illustrated in FIG. 12, in top surfaces of the outer frames 67, grooves 67*a* where the seal part 30 is accommodated may be formed. When the pressure-regulating valve 10 is in a closed state, the seal part 30 is in contact with the case 60 and the cover part 20.

Operation of the pressure-regulating valve 10 will be described. The cover part 20 includes a circumferential edge surrounding the discharge holes 68 of the case 60 in a plan view. When the pressure-regulating valve 10 is in the closed state, the elastic member 40 generates urging force urging the cover part 20 toward the enclosure 100. Thus, the circumferential edge of the cover part 20 comes into contact with the seal part 30 attached to the outer frames 67 of the case 60. This closes the discharge holes 68 of the case 60.

If the internal pressure of the enclosure 100 exceeds a predetermined threshold, force applied by the internal pressure to the cover part 20 is greater than force applied by the elastic member 40 to the cover part 20. As a result, the cover part 20 moves upward. The cover part 20 moves upward until the force applied by the internal pressure to the cover part 20 balances with the force applied by the elastic member 40 to the cover part 20. This enables an open state where the opening 103 and the discharge holes 68 are open. In the open state, the elastic member 40 contracts more than the elastic member 40 in the closed state.

When the cover part 20 moves upward, a gap is formed between the circumferential edge of the cover part 20 and the outer frames 67 of the case 60. As described above, the discharge holes 68 of the case 60 overlap the opening 103 of the enclosure 100. In other words, the discharge holes 68 communicate with the opening 103. The fluid inside the enclosure 100 passes through the opening 103 of the enclosure 100 and the discharge holes 68 of the case 60 and is then released outside from the gap between the case 60 and the cover part 20.

As the fluid is released outside, the internal pressure decreases. If the force applied by the internal pressure to the cover part 20 is smaller than the force applied by the elastic member 40 to the cover part 20, the restoring force of the elastic member 40 moves the cover part 20 downward, and the pressure-regulating valve 10 returns to the closed state.

Third Modification

An example structure of the cover part 20 will be described. As illustrated in FIG. 12, the cover part 20 may include a protective wall 27 expanding from a central portion of the bottom surface of the upper portion 211 of the cover body 21 toward the enclosure 100. When the pressure-regulating valve 10 is in the closed state, the protective wall 27 is positioned outside the housing 61 of the case 60. The protective wall 27 may have a tube shape covering the housing 61 in the radial direction of the pressure-regulating valve 10. The protective wall 27 protects the housing 61 and the shaft 22. For example, in the event of a fire inside the enclosure 100, the protective wall 27 prevents the housing 61 and the shaft 22 from being exposed to hot air. By protecting the housing 61 and the shaft 22, the open/close function of the cover part 20 can be prevented from being lost.

Although not illustrated, even in the above-described embodiment, the cover part 20 may include a protective wall 27. For example, in the embodiment illustrated in FIGS. 1 to 8, the cover part 20 may include the protective wall 27 positioned outside the housing 51 of the base part 50.

Fourth Modification

An example configuration of the case 60 will be described. As illustrated in FIG. 12, the case 60 may include a metal bracket 60A and a resin layer 60B. The metal bracket 60A is a member manufactured by bending a metal plate. The metal bracket 60A includes a bent portion at which the metal plate is bent. The resin layer 60B is in contact with the metal bracket 60A.

The case 60 including the metal bracket 60A and the resin layer 60B is manufactured by, for example, insert molding. The insert molding includes, for example, a process of placing the metal bracket 60A between a first mold and a second mold and a process of injecting resin between the first mold and the second mold.

The metal bracket 60A preferably forms at least a portion, supporting the elastic member 40, of the case 60 and a portion, fixed to the surface 101 of the enclosure 100, of the case 60. For example, the metal bracket 60A is preferably positioned at the housing 61 and the legs 62. For example, the metal bracket 60A composed of a single metal plate expands to the housing 61 and the legs 62. The metal bracket 60A may be positioned at the outer frames 67 in addition to the housing 61 and the legs 62. For example, the metal bracket 60A composed of a single metal plate may expand to the housing 61, the legs 62, and the outer frames 67.

By using the metal bracket 60A, heat resistance of the case 60 can be increased. For example, in the event of a fire inside the enclosure 100, the housing 61 can be prevented from falling off. This can prevent the open/close function of the cover part 20 from being lost. Thus, after a fire, explosion, or the like occurs and the cover part 20 is in the open state, the cover part 20 can return to the closed state. When the cover part 20 returns to the closed state, oxygen supply from the outside to the inside of the enclosure 100 is cut off. Thus, a second fire, explosion, or the like can be prevented from occurring.

Although not illustrated, even in the above-described embodiment, the base part 50 which is the member corresponding to the case 60 may include a metal bracket and a resin layer. For example, in the embodiment illustrated in FIGS. 1 to 8, the metal bracket may form at least a portion, supporting the elastic member 40, of the base part 50 and a portion, fixed to the surface 101 of the enclosure 100, of the base part 50. For example, the metal bracket is preferably positioned at the housing 51 and the legs 52. For example, the metal bracket composed of a single metal plate expands to the housing 51 and the legs 52.

Other Modifications

A plurality of the modifications may be combined with the above-described embodiment. The modifications may be mutually combined.

REFERENCE SIGNS LIST

10 Pressure-regulating valve
20 Cover part
21 Cover body
22 Shaft
23 Flange
24 Groove
25 End lock
27 Protective wall
30 Seal part
40 Elastic member
50 Base part
51 Housing
52 Leg
55 Fastening tool 60 Case
60A Metal bracket
60B Resin layer
61 Housing
62 Leg
63 Fastened portion
64 Engaging portion
67 Outer frame
68 Discharge hole
100 Enclosure
101 Surface
102 Rear surface
103 Opening
104 Protrusion
105 Fastening hole

What is claimed is:

1. A pressure-regulating valve for escaping a fluid inside an enclosure from an opening of the enclosure when an internal pressure of the fluid rises, the pressure-regulating valve comprising:

a cover part including a circumferential edge configured to surround the opening in a plan view, and covering the opening;

a seal part configured to be positioned between the circumferential edge of the cover part and a surface of the enclosure;

an elastic member configured to generate urging force urging the cover part toward the enclosure in a first direction; and a base part configured to be fixed to the enclosure and supporting the elastic member such that the elastic member expands and contracts in the first direction, wherein the base part includes a housing and a plurality of legs coupled to the housing, each of the plurality of legs extends outward from the housing in a plan view, and each end of the plurality of legs is configured to be fastened to protrusions protruding inward from an outer edge of the opening of the enclosure.

2. The pressure-regulating valve according to claim 1, wherein the cover part includes a cover body, and a shaft coupled to the cover body and configured to extend toward the opening of the enclosure, and the housing of the base part engages the shaft, and each of the plurality of legs extends outward from the housing in a plan view, and configured to be fastened to the surface of the enclosure.

3. A pressure-regulating valve for escaping a fluid inside an enclosure from an opening of the enclosure when an internal pressure of the fluid rises, the pressure-regulating valve comprising:

a cover part including a circumferential edge configured to surround the opening in a plan view, and covering the opening;

a seal part configured to be positioned between the circumferential edge of the cover part and a surface of the enclosure;

an elastic member configured to generate urging force urging the cover part toward the enclosure in a first direction; and a base part configured to be fixed to the enclosure and supporting the elastic member such that the elastic member expands and contracts in the first direction, wherein the cover part includes a cover body, and a shaft coupled to the cover body and configured to extend toward the opening of the enclosure, and the base part includes a housing engaging the shaft, and a plurality of legs coupled to the housing, extending outward from the housing in a plan view, and configured to be fastened to the surface of the enclosure, and ends of the legs are configured to be fastened to protrusions protruding inward from an outer edge of the opening of the enclosure.

4. The pressure-regulating valve according to claim 1, wherein the circumferential edge of the cover part is configured to be adjacent to the opening of the enclosure.

5. A pressure-regulating valve for escaping a fluid inside an enclosure from an opening of the enclosure when an internal pressure of the fluid rises, the pressure-regulating valve comprising:

a cover part including a circumferential edge configured to surround the opening in a plan view, and covering the opening;

a seal part configured to be positioned between the circumferential edge of the cover part and a surface of the enclosure;

an elastic member configured to generate urging force urging the cover part toward the enclosure in a first direction; and a base part configured to be fixed to the enclosure and supporting the elastic member such that the elastic member expands and contracts in the first direction, wherein the cover part includes a cover body, and a shaft coupled to the cover body and configured to extend toward the opening of the enclosure, and the base part includes a housing engaging the shaft, and a plurality of legs coupled to the housing, extending outward from the housing in a plan view, and configured to be fastened to the surface of the enclosure, and the cover part includes an end lock coupled to the shaft, and the elastic member includes an upper end which is in contact with the housing of the base part, and a lower end which is in contact with the end lock of the cover part.

6. The pressure-regulating valve according to claim 1, wherein the base part includes a metal bracket forming at least a portion of the base part supporting the elastic member and a portion of the base part configured to be fixed to the surface of the enclosure, and a resin layer which is in contact with the metal bracket.

* * * * *